(12) United States Patent
Ohno et al.

(10) Patent No.: US 6,412,757 B1
(45) Date of Patent: Jul. 2, 2002

(54) SHOCK ABSORBING APPARATUS

(75) Inventors: Takao Ohno, Nagoya; Kazushige Nakano, Toyota, both of (JP)

(73) Assignee: Toyotsu Eng. & Mfg. Co., Ltd., Toyota (JP)

( * ) Notice: Subject to any disclaimer, the term of this patent is extended or adjusted under 35 U.S.C. 154(b) by 0 days.

(21) Appl. No.: 09/775,631

(22) Filed: Feb. 5, 2001

(30) Foreign Application Priority Data

Nov. 13, 2000 (JP) ........................................ 2000-345550

(51) Int. Cl.[7] .................................................. F16F 1/18
(52) U.S. Cl. ...................... 267/36.1; 104/89; 104/172.4; 105/148
(58) Field of Search ............................ 267/36.1, 7, 192, 267/3, 229, 232, 233; 104/89, 90, 91, 118, 172.4; 105/148, 141

(56) References Cited

U.S. PATENT DOCUMENTS

| | | | | |
|---|---|---|---|---|
| 3,793,965 A | * | 2/1974 | Winters | 104/172.4 |
| 3,934,516 A | * | 1/1976 | Paglia | 104/172.4 |
| 4,058,064 A | * | 11/1977 | Wilder et al. | 104/172.4 |
| 5,524,548 A | * | 6/1996 | Fox | 104/89 |
| 5,839,567 A | * | 11/1998 | Kyotani et al. | 198/683 |

* cited by examiner

*Primary Examiner*—Pam Rodriguez
(74) *Attorney, Agent, or Firm*—Oblon, Spivak, McClelland, Maier & Neustadt, P.C.

(57) ABSTRACT

A shock absorbing apparatus that absorbs a shock produced by an abutment of a traveler on a stop member when the traveler is brought to a stop at a predetermined position includes a leaf spring arranged adjacent the stop member in a substantially face-to-face relationship with a guideway. A free end of the leaf spring abuts slightly with the guideway or with a slight clearance from the guideway. A mid portion of the leaf spring is curved gradually from the guideway. The traveler is provided with a contact portion that passes over the free end of the leaf spring to contact with the curved mid portion before the traveler abuts with the stop member at the predetermined position.

4 Claims, 2 Drawing Sheets

SHOCK ABSORBING APPARATUS

BACKGROUND OF THE INVENTION

1. Field of the Invention

The present invention relates to a shock absorbing apparatus for absorbing a mechanical shock that occurs when a traveler running on a guide way is brought to a stop by abutting on a stop member.

2. Description of the Prior Art

A traveler such as a trolley that runs on a guide way is required to be brought to a cushioned stop to convey a load to a predetermined position. It is well known to arrange a resilient member, for example, a rubber or resilient resin pad or a shock absorber to which a traveler is brought into resilient engagement before it abuts with a stop member at the predetermined position.

However, in the case where the rubber or resilient resin pad is arranged, considerable noise is produced when the traveler is brought into engagement with the pad. It is also difficult to stop the traveler precisely at the predetermined position because the traveler rebounds from the pad. In the case where the shock absorber is arranged, the noise problem cannot be overcome, though the traveler can be stopped precisely. The shock absorber which generally comprises a piston and cylinder mechanism, containing fluid therein and a spring urging the piston to one end position is expensive and requires large space to be attached.

SUMMARY OF THE INVENTION

It is, therefore, a primary object of the present invention to provide a new and improved shock absorbing apparatus capable of providing a traveler that runs on a guide way and which stops silently and precisely at a predetermined position.

Another object of the present invention is to provide a shock absorbing apparatus that is simple in construction and low in cost.

A further object of the present invention is to provide a shock absorbing apparatus that can be easily disposed adjacent to a stop member with which the traveler abuts at a predetermined position.

Still another object of the present invention is to provide a shock absorbing apparatus wherein the resilient force of a leaf spring urges the traveler towards the support surface of the guide way that supports the weight of the traveler when the traveler contacts with the leaf spring. As a result, the traveling speed of the traveler is decreased to keep the traveler stable.

An additional object of the present invention is to provide a shock absorbing apparatus wherein the leaf spring is fixed to a stop member so as to be movable therewith when the stop member is moved to change a predetermined position where the traveler is to be stopped.

According to the present invention, the foregoing and other objects are attained by providing an apparatus for absorbing a shock produced upon abutment of a traveler on the stop member with a leaf spring that is arranged adjacent the stop member substantially parallel and in a face-to-face relationship with the guide way for the traveler, said leaf spring including a mid portion which is curved gradually apart from the guide way to contact with the traveler before the same abuts with the stop member.

BRIEF DESCRIPTION OF THE DRAWINGS

The above and other objects, features and many of the attendant advantages of the invention will readily be appreciated as the same becomes more apparent when the following description taken in conjunction with the accompanying drawings wherein like reference numbers designate the same or corresponding parts throughout the several views and in which.

DESCRIPTION OF THE PREFERRED EMBODIMENT

Figure 1:
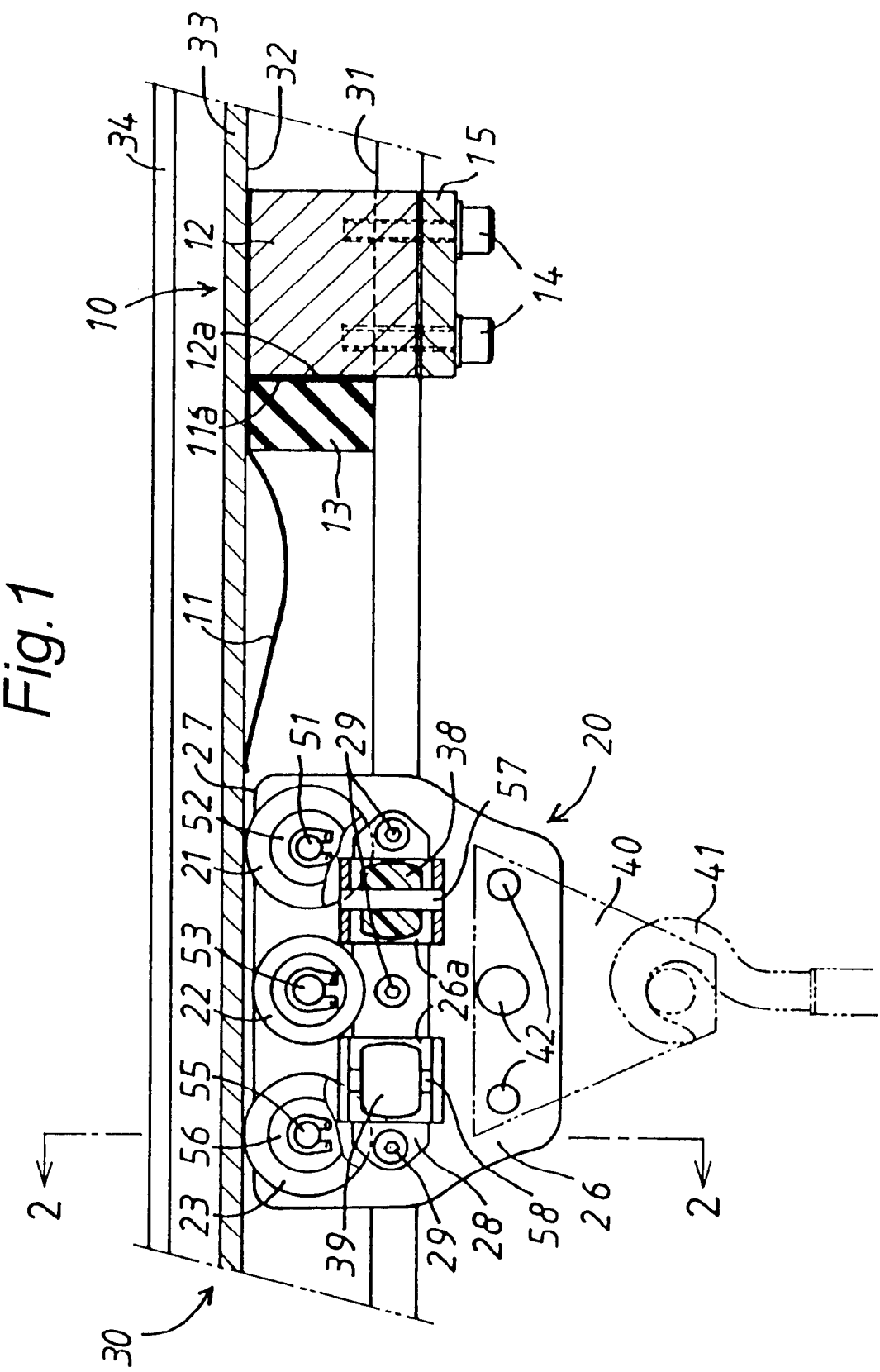
FIG. 1 shows a longitudinal sectional view of a preferred embodiment according to the invention.
Figure 2:
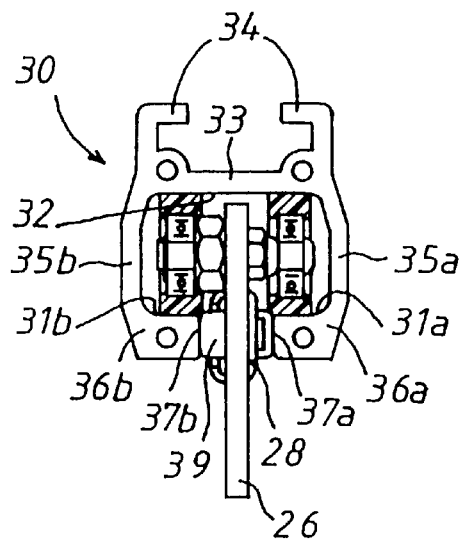
FIG. 2 shows a section taken along the line 2—2 in FIG. 1.
Figure 3:
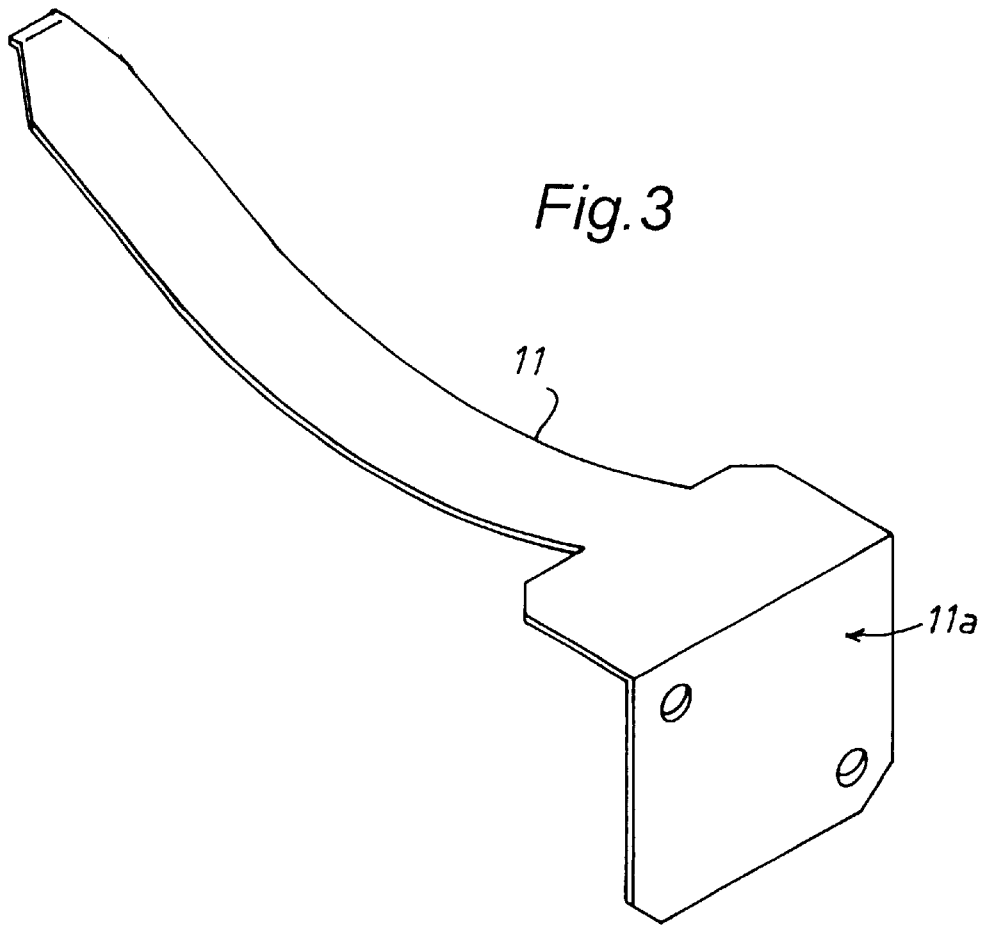
FIG. 3 shows a perspective view of a leaf spring.

Referring now to FIG. 1, there is shown a shock absorbing apparatus 10 according to the invention for absorbing a mechanical shock that is produced when a traveler such as a trolley 20 movably mounted on a long guide way 30 is stopped upon abutment with a stop member 12. As shown in FIG. 2, for the purpose of horizontally securing the guide way 30 at an upper part of a factory mounting portions 34 are provided on a base 33 of the guide way 30. The guide way 30 has guide portions 35a, 35b that extend downwardly in parallel relation with each other on both sides of the base 33. The guide portions 35a, 35b are provided at the lower ends thereof with horizontally-inwardly extending support portions 36a, 36b to form support surfaces 31a, 31b thereon. Rollers 21, 23 rotatably moveable along the trolley 20 are mounted on the support surfaces 31a, 31b so that the trolley 20 can be guided along the support surfaces 31a, 31b of the guide way 30 and the weight of the trolley 20 can be carried on the support surfaces 31a, 31b. An auxiliary surface 32 is formed at the lower surface of the base 33 in face-to-face relationship with said support surfaces 31a, 31b. The auxiliary surface 32 abuts with a slight clearance against the top portions of the rollers 21, 23 to prevent the rollers 21,23 from moving upwardly. Rollers 38, 39 are mounted rotatably about respective vertical axes 57, 58 fixed on the trolley 20 and are interposed between vertical surfaces 37a, 37b which are formed respectively on the support portions 36a, 36b in face-to-face relationship, thereby preventing the trolley 20 from swinging transversely.

A stop member 12 of the shock absorbing apparatus 10 is interposed between the supporting surfaces 31a, 31b and the auxiliary surface 32. The stop member 12 is secured to the guide way 30 by bolting a plate 15 that abuts on the lower surface of the guide way 30 onto the stop member 12 between the vertical surfaces 37a and 37b thereby to clasp the support portions 36a, 36b between the stop member 12 and the plate 15. A shock absorbing leaf spring 11 is fixed at its one end to the front surface 12a of the stop member 12 and is arranged substantially in parallel with and in face-to-face relationship with the auxiliary surface 32 along the guide way 30. The free end of the leaf spring 11 abuts slightly on the auxiliary surface 32, or may abut with a slight clearance against the auxiliary surface 32. The mid portion of the leaf spring 11 is curved gradually apart from the auxiliary surface 32. A resilient member 13 is interposed between the stop member 12 and the mid portion of the leaf spring 11. The leaf spring 11 has a flat portion that contacts with the auxiliary surface 32 between the fixed portion 11a to the stop member 12 and the curved mid portion. The resilient member 13 is supported between the support surfaces 31a, 31b and the flat portion of the leaf spring 11.

A body 26 of the trolley 20 is formed with an approximately rectangular plate that has a sufficient thickness to form the body of a construction. The upper portion of the body 26 is disposed between the support surfaces 31a, 31b and the auxiliary surface 32, and the lower portion thereof projects below the guide way 30 through the space between the vertical surfaces 37a and 37b. Front and rear axle members 51, 55 are inserted respectively into holes which are formed transversely horizontally at the upper front and upper rear portions of the body 26 and are secured by nuts on threaded portions of the axle members 51, 55. The front and rear rollers 21, 23 are respectively rotatably mounted on both end portions of the front and rear axle members 51, 55 by means of bearings 52, 56 at both sides of the body 26. The front and rear rollers 21, 23 are respectively mounted on the support surfaces 31a, 31b, and the top portions of rollers 21, 23 abut with a slight clearance against the auxiliary surface 32, so that rollers can run along guide way 30. An auxiliary axle member 53 is secured to the body 26 at the upper portion thereof between the front and rear axle members 51, 55 in the same manner as axle members 51, 55. Auxiliary rollers 22 are rotatably mounted on both end portions of the auxiliary axle 53 by means of bearings at both sides of the body 26. The auxiliary rollers 22 support the trolley 20 on the support surfaces 31a, 31b when the front or rear roller is broken. The front and rear rollers 21, 23 have the same diameter, while the auxiliary rollers 22 have a slightly smaller diameter than rollers 21, 23, thereby being kept slightly apart from the support surfaces 31a, 31b. The auxiliary rollers 22 have a greater resistance against rotation than those of the front and rear rollers 21, 23 to dampen the movement of the trolley 20 when the auxiliary rollers 22 make contact with the support surfaces 31a, 31b. The rollers 21,23 are made of nylon resin.

Front and rear rectangular openings 26a are formed side by side at a vertically middle portion of the body 26. The side rollers 38, 39 are respectively disposed within the openings 26a. A bracket 28 is fixed by bolts 29 on a side of the body 26. Upper and lower tabs bent horizontally from the plane of the bracket 28 are inserted into the openings 26a to support both the ends of vertical axle members 57, 58 on which the side rollers 38, 39 are rotatably mounted. The side rollers 38, 39 are of a diameter slightly smaller than the distance between vertical surfaces 37a and 37b and project beyond both the respective sides of the body 26, thereby being guided along by vertical surfaces 37a, 37b so that the trolley is prevented from swinging transversely while traveling. The body 26 has holes formed through the lower portion thereof to attach a connecting member 40 on which a hook 41 of a hoist is detachably hung.

The mode of operation of the shock absorbing apparatus as constructed above will now be described briefly. The hoist is hung on the trolley 20 by means of a hook 41. A load is tied to the hoist to be lifted up from the ground. The trolley 20 is traveled by an operator to the predetermined position along the guide way 30. The rollers 21, 23 roll on the support surfaces 31a, 31b of the guide way 30. If the rollers 21, 23 or axle members 51, 55 are broken, the auxiliary rollers 22 abut on the support surfaces 31a, 31b to prevent the trolley from falling out of the guide way 30. When the trolley 20 is traveled close to the stop member 12, a contact portion 27 at the upper portion of the body 26 comes into contact with the leaf spring 11 of the shock absorbing apparatus 10 to compress the leaf spring 11 toward the auxiliary surface 32. Thus, the leaf spring 11 absorbs the kinetic energy of the trolley 20 to decrease the traveling speed, whereby the trolley 20 is stopped precisely at the predetermined position without rebounding when the trolley 20 abuts on the stop member 12. The resilient spring force of the leaf spring 11 urges the traveler 20 towards the support surfaces 31a, 31b that support the weight of the traveler 20 whereby the traveler 20 can be stopped in a stable and reliable manner.

The kinetic energy of the trolley 20 while traveling varies depending upon the weight of the load carried by the trolley. When the weight of a load is changed, the shock absorbing apparatus 10 of the present invention can be easily adjusted to absorb the kinetic energy of the trolley 20 by changing the leaf spring 11 with another having a different spring constant.

Instead of the leaf spring 11 arranged to face the auxiliary surface 32, leaf springs may be arranged respectively in face-to-face relationship with support surfaces 31a, 31b. In this modified use, the free ends of the leaf springs abuts the support surfaces 31a, 31b, and the mid portions of the leaf springs are curved gradually apart from the support surfaces 31a, 31b.

Further, in another modified form the rollers 21, 23 may be rotatably mounted at the lower front and lower rear portions of the body 26 so that the trolley is moved with its upper portion projecting upwardly from the guide way 30.

In still another modified form, the shock absorbing leaf spring 11 may be fixed to the base 33 of the guide way 30.

Obviously, numerous modifications and variations of the present invention are possible in light of the above teachings. It is therefore to be understood that within the scope of the appended claims, the invention may be practiced otherwise than as specifically described herein.

What is claimed is:

1. A shock absorbing apparatus for absorbing a shock produced when a traveler running along a guide way is brought into abutment with a stop member so as to be stopped at a predetermined position, wherein said guide way includes a lower support surface and an upper auxiliary surface which extend parallel with each other along said guide way and wherein said traveler rotatably carries rollers for enabling said traveler to move along said lower support surface; said apparatus comprising:

a leaf spring arranged adjacent said stop member substantially in a parallel and face-to-face relationship with said upper auxiliary surface, said leaf spring having a free end for one of abutting said upper auxiliary surface and forming a clearance with respect to said upper auxiliary surface and a mid portion curved gradually apart from said upper auxiliary surface; and a contact portion provided on said traveler for passing over said free end of said leaf spring so as to contact with said curved mid portion of said leaf spring right before said traveler abuts on said stop member whereby the traveler is urged to said lower support surface while decreasing its traveling speed.

2. An apparatus as set forth in claim 1, wherein said leaf spring is fixed to said stop member at an end opposite said free end, and a resilient member is interposed between said stop member and said curved mid portion of said leaf spring.

3. An apparatus as set forth in claim 1 or 2, wherein a diameter of said rollers carried on said traveler is smaller than a distance between said lower support surface and said upper auxiliary surface so as to define said clearance between top portions of said rollers and said upper auxiliary surface.

4. An apparatus as set forth in claim 1, wherein said rollers comprise large diameter rollers carried at both end portions of said traveler in a moving direction thereof and at least one small diameter roller carried at a mid portion of said traveler in the moving direction, and wherein said at least one small diameter roller has a larger resistance against rotation than said larger diameter rollers.

* * * * *